United States Patent [19]
Nayder et al.

[11] Patent Number: 5,218,031
[45] Date of Patent: Jun. 8, 1993

[54] AQUEOUS COATING COMPOSITIONS, PROCESS AND COATED SUBSTRATES

[75] Inventors: Daniel A. Nayder, Strongsville; David A. Blaha, Parma, both of Ohio

[73] Assignee: Man-Gill Chemical Company, Cleveland, Ohio

[21] Appl. No.: 712,937

[22] Filed: Jun. 10, 1991

[51] Int. Cl.$^5$ .................. C08K 5/02; C08L 27/12; C08J 7/04
[52] U.S. Cl. .................. 524/376; 524/462; 524/520; 523/406
[58] Field of Search .................. 523/406; 524/376, 520, 524/462

[56] References Cited

U.S. PATENT DOCUMENTS

| | | | |
|---|---|---|---|
| 3,055,865 | 9/1962 | Craig | 260/47 |
| 3,133,838 | 5/1964 | Higgins | 148/6.15 |
| 3,215,715 | 11/1965 | Wurstner | 260/429.9 |
| 4,022,737 | 5/1977 | Sekmakes | 260/29.4 VA |
| 4,252,878 | 2/1981 | Lazarz et al. | 429/250 |
| 4,302,374 | 11/1981 | Helle et al. | 524/168 |
| 4,373,043 | 2/1983 | Yagi et al. | 524/366 |
| 4,544,677 | 10/1985 | Allen et al. | 521/91 |
| 4,835,084 | 5/1989 | Nair et al. | 524/366 |
| 4,952,293 | 8/1990 | Supula et al. | 204/180.7 |
| 5,001,173 | 3/1991 | Anderson et al. | 523/406 |
| 5,093,400 | 3/1992 | Arcella et al. | 524/366 |

FOREIGN PATENT DOCUMENTS 1182365 7/1989 Japan .................. 524/376

OTHER PUBLICATIONS

"Computer-Based Fastener Assembly Performance Analysis at a Large Metal Finishing Company", B. P. Lowry, Fastener Technology International, pp. 57, 58, 60 and 61, Feb., 1991.

Primary Examiner—Paul R. Michl
Assistant Examiner—Andrew E. C. Merriam
Attorney, Agent, or Firm—Renner, Otto, Boisselle & Sklar

[57] ABSTRACT

In accordance with the present invention, there is provided an aqueous coating composition comprising in addition to water,
(A) at least one water-dispersible or emulsifiable film-forming resin;
(B) from about 0.1 to about 15% by weight, based on the weight of resin (A) of a hydrophobic fluoroalkene polymer; and
(C) an effective amount of at least one nonionic fluorocarbon surfactant.

In one preferred embodiment, the aqueous coating compositions of the present invention may contain an organic phosphate ester. The compositions may also contain one or more pigments. The invention also relates to the use of such coating compositions for depositing coatings on metal substrates, and in particular, for coatings on phosphated metal substrates.

10 Claims, 2 Drawing Sheets

AQUEOUS COATING COMPOSITIONS, PROCESS AND COATED SUBSTRATES

TECHNICAL FIELD

This invention relates to an aqueous composition which can be electrodeposited on metal substrates, to a process of coating substrates with a film of the aqueous coating compositions, and to coated metal substrates. The invention relates particularly to the coating of metal substrates to improve corrosion-resistance of the coated substrates and to impart improved and uniform torque (slip) properties to the coated surfaces.

BACKGROUND OF THE INVENTION

Siccative organic coating compositions have been applied to metal surfaces such as by spraying, dipping, rolling, centrifuged dip-spinning, etc. In recent years, various water-soluble resin-based paints and lacquers have been developed, and progress has been made toward the application of such coating systems by electrophoresis. The electrophoretic application of paint and lacquer involves the phenomena of electro-osmosis and electrolysis, as well as electrophoresis. In this method, an electric current is passed through the paint or lacquer solution while the article to be painted is made an electrode, usually the anode, in the paint or lacquer.

The electrodeposition of water-based coatings has been employed to process metal parts including small stamped parts such as nuts, bolts, and fasteners. The use of electrodeposition of siccative organic coatings on small parts has advantages over other methods of coating. For example, the process deposits a film of uniform thickness on essentially any conductive surface, even those which have sharp points and edges. The electrocoated film when applied, is relatively water-free and, thus, will not run or drip when taken out of the bath. The use of water-base coating compositions also is advantageous since they contain little or no organic solvents or other volatile organic compounds. Accordingly, such aqueous systems and processes do not require special precautions or equipment for handling any harmful volatile materials, and such aqueous systems and processes do not contribute to the problem of volatile organic emissions and air pollution.

It also is well known in the metal-finishing art that metal surfaces such as aluminum, ferrous and zinc surfaces may be provided with an inorganic phosphate coating by contacting the surfaces with an aqueous phosphating solution. The phosphate coating protects the metal surface to a limited extent against corrosion and serves primarily as an excellent base for the later application of a siccative organic coating composition such as paint, lacquer, varnish, primer, synthetic resin, enamel, and the like. Procedures also have been described in the art for improving the rust-resistance of metal articles by the application of a film of paint over phosphated surfaces. Although the application of a siccative coating over a phosphated metal surface improves the corrosion resistance properties of the metal, there continues to be a need to improve the corrosion resistance of electrophoretically painted metal surfaces. It is also desirable to develop coating formulations which impart improved and uniform torque (slip) properties to small coated articles such as coated fastener threads.

U.S. Pat. No. 4,952,293 describes a polymer electrodeposition process for preparing free-standing polymeric belts. The bath used to deposit the free-standing belts comprises a dispersion of electrically charged, thermoplastic film-forming polymer particles in an organic liquid dispersion medium substantially free of water. The polymer particles are substantially insoluble in the organic dispersion liquid medium at electrodeposition temperatures but are sufficiently soluble in the organic dispersion liquid medium at elevated drying temperatures to coalesce and form a viscous coating. Examples of the film-forming powders include polyvinylfluoride, and the dispersions may contain surfactants including fluoro surfactants including Zonyl FSC surfactants (cationic), charge control agents (other surfactants) and filler particles.

U.S. Pat. No. 4,544,677 describes foamable polycarbonate compositions comprising a mixture of a polycarbonate resin alone or with a polyester, a minor amount of a foaming agent, and a minor amount of an inorganic non-fibrous particulate nucleating agent alone, or with a particular organic polymeric material. The particular organic polymeric material may be a PTFE powder. Surfactants may also be included, and these are preferably nonionic surfactants such as silicones, polyglycol ethers, fluorocarbons, fatty acid derivatives, etc.

U.S. Pat. No. 4,252,878 describes a process for making hydrophobic polymeric separators wettable to electrolytic cell fluids by a post-manufacturing process of treating with fluorinated surface-active agents. The separators comprise various polymers including polytetrafluoroethylene, polyvinyl fluoride, polyvinylidene fluoride, polychlorotrifluoroethylene, polyfluoroethylene polyfluoropropylene, etc. Non-fluorine-containing polymers such as polyvinyl chloride also may be utilized. The surface-active agents employed are preferably fluorinated compounds which may be anionic, cationic, nonionic or amphoteric-type surfactants. A number of examples are given of each type of surfactant including non-ionic surfactants having perfluorinated hydrocarbon chains in their structure such as those available from DuPont under the trade designation Zonyl FSN.

U.S. Pat. No. 4,022,737 describes aqueous dispersions of hydrophobic polymer particles using surface-active polymers. Polyvinylidene particles may be stably dispersed in water by means of a surfactant which is a carboxy-functionalized copolymer. Other examples of hydrophobic polymer particles described in the patent include polyvinyl fluoride and polytetrafluoroethylene.

SUMMARY OF THE INVENTION

In accordance with the present invention, there is provided an aqueous composition comprising in addition to water,
(A) at least one water-dispersible or emulsifiable film-forming resin;
(B) from about 0.1 to about 15% by weight, based on the weight of resin (A) of a hydrophobic fluoroalkene polymer; and
(C) an effective amount of at least one nonionic fluorocarbon surfactant.

In one embodiment, the aqueous compositions of the present invention also contains an organic phosphate ester. The compositions may also contain one or more pigments. The invention also relates to the use of such compositions for coating metal substrates, and in particular, to coatings for phosphated metal substrates.

DESCRIPTION OF THE PREFERRED EMBODIMENTS (A) Water-Dispersible or Emulsifiable Film-Forming Resin.

The aqueous composition of the present invention contain (A) at least one water-dispersible or emulsifiable film-forming resin. Any water-dispersible or emulsifiable film-forming resin can be utilized in the aqueous compositions of the present invention provided that the aqueous compositions containing such resins deposit an adherent coating on a substrate. The resins which have been found to be particularly useful in the aqueous compositions of the present invention are thermosetting resins such as urethanes, amino resins, acrylic resins, alkyd resins, epoxy resins, phenolic resins, cyclized olefin rubbers, halogenated polyolefins, halo-sulfonated polyolefins, and mixtures thereof. Particularly useful are the epoxy resins and mixtures of epoxy resins and amino resins, (e.g., melamine resins). The amount of resin included in the aqueous compositions (concentrates) of this invention may range from about 5 to about 90% by weight. In one preferred embodies the aqueous compositions contain from about 5 to about 25% by weight of resin.

Thermosetting epoxy resins are particularly useful in the present invention as component (A) and they include any of a number of well-known organic resins which are characterized by the presence therein of the epoxide group A wide variety of such resins are available commercially. Such resins have either a mixed aliphatic-aromatic or an exclusively non-benzeneoid (i.e., aliphatic or cycloaliphatic) molecular structure.

The mixed aliphatic-aromatic epoxy resins which are useful with the present invention are prepared by the well-known reaction of a bis(hydroxy-aromatic) alkane or a tetrakis-(hydroxyaromatic)-alkane with a halogen-substituted aliphatic epoxide in the presence of a base such as, e.g., sodium hydroxide or potassium hydroxide. Under these conditions, hydrogen halide is first eliminated and the aliphatic epoxide group is coupled to the aromatic nucleus via an ether linkage. Then the epoxide groups condense with the hydroxyl groups to form polymeric molecules which vary in size according to the relative proportions of reactants and the reaction time.

In lieu of the epichlorohydrin, one can use halogen-substituted aliphatic epoxides containing about 4 or more carbon atoms, generally about 4 to about 20 carbon atoms. In general, it is preferred to use a chlorine-substituted terminal alkylene oxide (terminal denoting that the epoxide group is on the end of the alkyl chain) and a particular preference is expressed for epichlorohydrin by reason of its commercial availability and excellence in forming epoxy resins useful for the purpose of this invention.

If desired, the halogen-substituted aliphatic epoxide may also contain substituents such as, e.g., hydroxy keto, nitro, nitroso, ether, sulfide, carboalkoxy, etc.

Similarly, in lieu of the 2,2-bis-(p-hydroxyphenyl)-propane, one can use bis-(hydroxyaromatic) alkanes containing about 16 or more carbon atoms, generally about 16 to about 30 carbon atoms such as, e.g., 2,2-bis-(1-hydroxy-4-naphthyl)-propane; 2,2-bis(o-hydroxyphenyl)propane; 2,2-bis-(p-hydroxyphenyl)butane, 3,3-bis-(p-hydroxyphenyl)hexane; 2-(p-hydroxyphenyl)-4-(1-hydroxy-4-naphthyl)octane,5-5-bis-(p-hydroxy-o-methylphenyl)-decane,bis-(p-hydroxyphenyl) methane, 2,2-bis-(p-hydroxy-o-isopropylphenyl)propane, 2,2-bis-(o,p-dihydroxyphenyl)propane, 2-(p-hydroxyphenyl)-5-(o-hydroxyphenyl)hexadecane, and the like. If desired, the bis-(hydroxyaromatic)alkane may contain substituents such as, e.g., halogen, nitro, nitroso, ether, sulfide, carboalkoxy, etc. In general, it is preferred to use a bis-(p-hydroxyphenyl)alkane since compounds of this type are readily available from the well-known condensation of phenols with aliphatic ketones or aldehydes in the presence of a dehydrating agent such as sulfuric acid. Particularly preferred is 2,2-bis-(p-hydroxyphenyl)propane, which is available commercially as "Bisphenol A".

Epoxy resins of the type described above are available from a wide variety of commercial sources. One group is known by the general trade designation "Epon" resins and are available from Shell Chemical Co. For example, "Epon 820" is an epoxy resin having an average molecular weight of about 380 and is prepared from 2,2-bis-(p-hydroxyphenyl)propane and epichlorohydrin. Similarly, "Epon 1031" is an epoxy resin having an average molecular weight of about 616 and is prepared from epichlorohydrin and symmetrical tetrakis-(p-hydroxyphenyl)ethane. "Epon 828" has a molecular weight of 350-400 and an epoxide equivalent of about 175-210.

Another group of commercially available epoxy resins are identified under the general trade designation EPI-REZ (Celanese Resins, a Division of Celanese Coatings Company). For example, EPI-REZ 510 and EPI-REZ 509 are commercial grades of the diglycidyl ether of Bisphenol A differing slightly in viscosity and epoxide equivalent.

Another group of epoxy resins are available from Furane Plastics Inc., Los Angeles, Calif. under the general trade designations EPIBOND and EPOCAST. For example, EPIBOND 100A is a one component epoxy resin powder available from Furane which is curable to a hard resin in the absence of any hardener.

Liquid forms of epoxy resin are also useful. These liquid forms normally comprise very viscous liquids requiring some degree of heating to permit withdrawal from storage containers. Certain "D.E.R." resins obtainable from Dow Chemical Company and "Epotuf" liquid epoxy resins obtainable from Reichhold Chemicals Inc. are examples of such resins preferred for employment in accordance with the invention. An example of an "Epotuf" liquid epoxy resin in the undiluted medium high viscosity #37-140 having an epoxide equivalent weight of 180–195, a viscosity (ASTM D445) of 11,000–14,000 cps at 25° C., and a Gardner Color Maximum of 3. This is a standard general purpose epoxy resin.

In some embodiments of the invention the epoxy resins may be "solubilized" by neutralization with a basic compound such as an organic amine. Examples of amines include amines and hydroxyamines including diethylamine, triethylamine, triethanolamine, dimethylethanolamine, etc.

The amino resins (sometimes referred to as aminoplast resins or polyalkylene amides) useful in the coating compositions are nitrogen-rich polymers containing nitrogen in the amino form, —NH$_2$. The starting amino-bearing material is usually reacted with an aldehyde (e.g., formaldehyde) to form a reactive monomer, which is then polymerized to a thermosetting resin. Examples of amino-bearing materials include urea, melamine, copolymers of both with formaldehyde, thiourea, aniline, dicyanodiamide, toluene sulfonamide, benzoguanamine, ethylene urea and acrylamide. Preferred amino resins are the melamine-formaldehyde and urea-formaldehyde resins.

Condensation products of other amines and amides can also be employed, for example, aldehyde condensates of triazines, diazines, triazoles, guanadines, guanamines and alkyl- and aryl-substituted derivatives of such compounds including alkyl- and aryl-substituted ureas and alkyl- and aryl-substituted melamines. Some examples of such compounds are N,N'-dimethylurea, benzourea, dicyandiamide, 2-chloro-4,6-diamino-1,3,5-triazine and 3,5-diaminotriazole. Other examples of melamine and urea-based cross-linking resins include alkylated melamine resins including methylated melamine-formaldehyde resins such as hexamethoxymethyl melamine, alkoxymethyl melamines and ureas in which the alkoxy groups have 1-4 carbon atoms such as methoxy, ethoxy, propoxy, or butoxymethyl melamines and dialkoxymethyl ureas; alkylol melamines and ureas such as hexamethylol melamine and dimethylol urea. The aminoplast cross-linking resins are particularly useful when another thermosetting resin in the aqueous composition is an alkyd resin, a polyester resin, an epoxy resin or an acrylic resin.

Some particularly useful commercially available aminoplast resins are amino resins sold by American Cyanamid under the general trade designation CYMEL. In particular, CYMEL 301, CYMEL 303 and CYMEL 1156, all of which are alkylated melamine-formaldehyde resins, are useful herein. Additional melamine-formaldehyde resins available from American Cyanamid include CYMEL 350, 370, 373, 380, 1116, 1130 and 1158. Benzoguanamines are available from American Cyanamid as CYMEL 1123, 1125 and 1134. Partially alkylated melamine resins from American Cyanamid include CYMEL 235, 243, 245, 248, 255, 270 and 280.

The polyurethane resins useful in the invention are those formed by reacting an organic diisocyanate with an active hydrogen-containing material such as polyalkylene ether glycols and hydroxy-terminated polyesters to form isocyanate-terminated polyurethane prepolymers which can be cross-linked or cured with known agents such as compounds having at least two amino nitrogen atoms each having at least one reactive hydrogen atom. Alternatively, the active hydrogen compound, organic diisocyanate and chain extender can be reacted in one shot to form the desired polymer.

In the preparation of polyester-urethane resins, there preferably are used hydroxy-terminated polyesters prepared by polycondensation of an aliphatic dicarboxylic acid and a molar excess of an aliphatic glycol, and those prepared by ring-opening polymerization of a cyclic ester of the presence of a difunctional compound as an initiator. The polyesters obtainable by polycondensation of an aliphatic dicarboxylic acid and an aliphatic glycol are exemplified by those obtained by reaction between adipic acid, sebacic acid, maleic acid and other dicarboxylic acids with ethylene-glycol, 1,2-propylene glycol, 1,4-butylene glycol, 1,3-butylene glycol, etc. Examples of the polyesters prepared by polymerization of cyclic esters are those prepared by epsilon-caprolactone, delta-methyl-epsilon-caprolactone and beta-propiolactone in the presence of an initiator such as, for example, 1,4-butylene glycol, ethylene glycol or diethylene glycol.

The polyalkylene ether urethanes are those prepared by reacting the isocyanates with polymeric polyhydroxy compounds which included polyether polyols such as polyalkylene ether glycols, polyalkylene arylene ether-thioether glycols and polyalkylene ether triols. The polyalkylene ether glycols and triols are preferred and these include glycols having the formula HO(RO)$_n$H wherein R is an alkylene radical which need not necessarily be the same in each instance, and n is an integer. Representative glycols include polyethylene ether glycol, polypropylene ether glycol and polytetramethylene ether glycol. Representative polyalkylene ether triols are made by reacting one or more alkylene oxides with one or more low molecular weight aliphatic triols. The alkylene oxides most commonly used have molecular weights between about 44 and 250 and these include ethylene oxide, propylene oxides, butylene oxides, 1,2-epoxybutane and 2,3-epoxybutane. The ethylene, propylene and butylene oxides are preferred. The aliphatic triols most commonly used have molecular weights between about 92 and 250. Examples include glycerol, 1,2,6-hexane triol and 1,1,1-trimethylol propane.

Representative examples of the polyalkylene ether triols include: polypropylene ether triol (molecular weight 700) made by reacting 608 parts of 1,2-propylene oxide with 92 parts of glycerin; and polypropylene ether triol (molecular weight 6000) made by reacting 5866 parts of 1,2-propylene oxide with 132 parts of 1,2,6-hexane triol.

Other active hydrogen-containing compound which can be reacted with polyisocyanates to form urethanes useful in the coating compositions of the invention are long-chain polymers containing at least two groups having at least one active hydrogen atom as determined by the Zerewitinoff method. Examples of such compounds include in addition to the polyesters and polymeric polyhydroxy compounds described above, polyamides, polyepoxides, reaction products of phenols and alkylene oxides, formaldehyde resins, hydrogenation products of olefin-carbon monoxide copolymers and polyepihalohydrins.

The acrylic resins are obtained by polymerizing a suitable combination of a functional group-containing monomer and another copolymerizable monomer in an ordinary manner. The polymerization temperature is ordinarily between about 60° C. and about 100° C., and polymerization time is usually within a range of about 3 to about 10 hours. Examples of the functional group-containing monomers include hydroxyl group-containing monomers such as beta-hydroxyethyethyl acrylate, beta-hydroxypropyl acrylate, beta-hydroxyethyl methacrylate, beta-hydroxypropyl methacrylate, N-methylol acrylamide and N-methylol methacrylamide; carboxyl group-containing monomers such as acrylic acid, methacrylic acid, itaconic acid, maleic acid, fumaric acid, as well as monoesters of maleic acid and fumaric acid with monoalcohols; alkoxyl group-containing monomers such as N-butoxy-methylmethacrylamide and N-butoxymethylacrylamide; and epoxy group-containing monomers such as glycidyl methacrylate, glycidyl acrylate and allyl glycidyl ether. These monomers may be used either alone or in the form of a combination of two or more of them. The functional group-containing monomer is used in an amount of about 5 to about 40% by weight of total monomers. Examples of the monomers copolymerized with these functional group-containing monomers include olefinically unsaturated monomers such as ethylene propylene and isobutylene; aromatic monomers such as styrene, vinyltoluene and alphamethylstyrene; ester of methacrylic acid and alcohols of 1 to about 18 carbon atoms such as methylmethacrylate, ethylmethacrylate, propylmethacrylate, n-butylmethacrylate, isobutylmethacrylate, cyclohexylmethacrylate, 2-ethylhexylmethacrylate and laurylmethacrylate; vinyl esters of carboxylic acid of about 1 to about 11 carbon atoms such as vinyl acetate, vinyl propionate and vinyl 2-ethylhexylic acid; as well as vinyl chloride, acrylonitrile and methacrylonitrile. They may be used either alone or in the form of a mixture of two or more of them.

The alkyd resins are obtained by reacting a dihydric or polyhydric alcohol and a polybasic acid or anhydride in the presence of a drying oil using known techniques. Examples of the dihydric or polyhydric alcohols include glycerol, pentaerythritol, sorbitol and diethylene glycol. Examples of the polybasic acids or anhydrides include phthalic acid, isophthalic acid, maleic anhydride, fumaric anhydride, nonconjugated linoleic acid, oleic acid, adipic acid, azelaic acid, sebacic acid, tetrachlorophthalic anhydride, and chlorendic anhydride. Examples of the drying oils include soybean oil, linseed oil, dehydrated castor oil, non-oxidizing castor and coconut oils, tung oil, fish oil, sunflower oil, walnut oil, safflower seed oil and tall oil. These alkyd resins may be produced, for example, by direct fusion of glycerol, phthalic anhydride and drying oil at a temperature in the range of from about 210° C. to about 235° C. solvents are then added to adjust the solids content. The amount of drying oil varies depending on the intended use. With respect to the high solids compositions of the invention, the level of drying oil is preferably minimized.

The phenolic resins are any of the several types of synthetic thermosetting resins made by reacting a phenol, cresols, xylenols, p-t-butyl phenol p-phenyl phenol, bis-phenols and resorcinol. Examples of the aldehydes include formaldehyde, acetaldehyde and furfural. Phenol-formaldehyde resins are a preferred class of such phenolic resins.

Cyclized olefin rubbers found to be useful in the coating compositions of the present invention include the cyclized rubbers obtained by isomerization of linear polyolefins such as polyisoprene into ring structures. More particularly, the cyclized rubber can be made by condensing rubber with metallic or metalloid halide catalysts such as stannic chloride, titanium tetrachloride, ferric chloride and antimony pentachloride in a suitable solvent. Upon treatment of the resultant product with acetone or alcohol, the cyclized rubber is formed and recovered. Other procedures for preparing cyclized rubber are described in U.S. Pat. Nos. 1,846,247; 1,853,334. The solvent may be an aromatic solvent such as toluene, xylene, benzene, and high-flash aromatic naphthas.

A commercially available cyclized olefin rubber found to be useful in the coating compositions of the present invention, either alone or in combination with other olefin polymers such as chlorinated polyolefins is a cyclized rubber derived from synthetic rubber by isomerization of the linear polyisoprene. This material is available from Daniel Products Company, Jersey City, N.J., under the general trade designation Synotex 800.

The water-dispersible or emulsifiable film-forming resin utilized in the aqueous compositions of the present invention also may be chlorinated polyolefins such as chlorinated polyethylene, chlorinated polypropylene, mixtures of chlorinated polyethylene and chlorinated polyolefin, etc. Chlorosulfonated polyolefins such as chlorosulfonated polyethylene and chlorosulfonated polypropylene also may be utilized.

Examples of chlorinated polyolefins which are useful in the aqueous compositions of the present invention include the chlorinated polyolefins available from Eastman Chemical Products, Inc. under the designations CP-343-1 and CP-343-3 which are chlorinated polyolefins in various concentrations of xylene including solutions containing 40% and 50% of the chlorinated polyolefins in xylene. Commercially available chlorosulfonated polyethylenes are available from the DuPont Company under the general trade designation Hypalon Synthetic Rubber.

Chlorosulfonated olefins such as chlorosulfonated polyethylene are derived from the reaction of a mixture of chlorine and sulfur dioxide on any of the various polyethylenes. The product of this reaction is a chemically modified form of the original polyethylene, and the product may contain from 20% to about 40% chlorine and about 1% to 2% sulfur present mostly as secondary sulfonyl chloride groups ($SRR'CHSO_2Cl$). The sulfonyl chloride groups are available as cross-linking or curing sites.

Mixtures of one or more of the above-described resins may be used with advantage. For example, mixtures of epoxy resins and amino resins are useful, and the amino resin serves as a crosslinking resin providing unique and desirable properties.

(B) Hydrophobic Fluoroalkene Polymer

The aqueous compositions of the present invention also contain from about 0.1 to about 15% by weight based on the weight of resin (A) of a hydrophobic fluoroalkene polymer. The fluoroalkene polymers include polymers and copolymers of vinyl fluoride, vinylidene fluoride or tetrafluoroethylene with other polymerizable monomers. The polymers and copolymers may be prepared by suspension polymerization or by bulk polymerization. An example of a commercially available polyvinylidene fluoride is Kynar 202 available from Pennwalt Corp. An example of a polyvinyl fluoride is Tedlar available from E. I. duPont de Nemours & Co.

In one preferred embodiment, the fluoroalkene polymer is a polytetrafluoroethylene (PTFE). Polytetrafluoroethylene is available commercially from DuPont under the general trade designation "Teflon". Copolymers of tetrafluoroethylene also are useful and these include polymers of $C_2$-$F_4$ modified with small amounts of mostly fluorinated comonomus; $C_2F_4$ polymers with other fluoroolefins, etc.

In the aqueous compositions of the present invention, it is preferred that the hydrophobic fluoroalkene polymer is added to the aqueous composition in the form of particles which may be colloidal particles or solid particles. Solid polytetrafluoroethylene particles are preferred in one embodiment of the invention, and the solid particles may have average particle diameters of from about 1 to about 10 microns. Particles having an average particle size of from 1 to 5 microns are particularly preferred, and it is desirable that the particles be characterized by a controlled particle size distribution so that there are few particles of greater than 10 microns in diameter. One example of a commercially available PTFE powder useful in the present invention is Shamrock SST-4 which is available from Shamrock Technologies, Newark, N.J. This powder is characterized as having a 4-micron grind with essentially no particles greater than 10 microns. The incorporation of the fluoroalkene polymer, and in particular, polytetrafluoroethylene powders into the aqueous compositions of the present invention results in the formation of coatings exhibiting improved and uniform torque properties and improved corrosion-resistance. In one embodiment, the aqueous compositions will contain from 1 to about 8% by weight, based on the weight of resin (A) of the fluoroalkene polymer powders although larger or smaller amounts may be utilized in particular aqueous compositions to maximize the desired properties.

(C) Nonionic Fluorocarbon Surfactants

The aqueous compositions of the present invention contain a small but effective amount of at least one nonionic fluorocarbon surfactant. Generally, this amount will range from about 0.01 to about 5% by weight based on the weight of resin (A) present in the aqueous composition. Alternatively, the amount of fluorocarbon present in the dispersion may be from about 5 to about 40% by weight based on the weight of fluoroalkene polymers present in the dispersion. Larger amounts of the fluorocarbon may be included in the aqueous coating compositions but are not generally required. In one embodiment, the amount of fluorocarbon surfactant included in the aqueous composition is an amount which is effective in stabilizing the aqueous coating composition. The fluorocarbon surfactant is surface-active and is also added to the aqueous compositions to modify the surface charge of the polymer particles in the film-forming thermosetting resin (A) and the fluorocarbon polymer particles (B). A stable dispersion is one which does not settle or is one which is easily dispersible when some sedimentation occurs.

The fluorocarbon surfactants which are particularly useful in the aqueous coating compositions of the present invention are nonionic fluorosurfactants which may be fluoro-containing compounds of the polyethylene glycol type, alkyl alkoxylates and alkyl esters. Among the preferred fluorosurfactants useful in the present invention are the fluorinated alkyl polyoxyethylene alcohols, and particularly those nonionic fluorocarbons having perfluorinated hydrocarbon chains in their structure. One type of such perfluorinated hydrocarbon chain containing surfactants comprise the fluorocarbons characterized by the following formula $$F_3C(CF_2)_mCH_2CH_2O(CH_2CH_2O)_nH \quad (I)$$

wherein m is from about 3 to about 19 and n is from about 6 to about 19, more preferably from about 7 to about 13. In another embodiment of Formula I, m is from 5 to about 9 and n is about 11. Various surfactants characterized by Formula I will have the perfluoroalkyl and polyethylene oxide portions thereof selected to provide a satisfactory film of the surfactant on the particles of the dispersion. The fluorocarbon surfactants are either liquid or are sufficiently soluble, emulsifiable or dispersible in water.

In lieu of the perfluoroalkyl moiety of the surfactants of Formula I, the fluorosurfactants may contain partially fluorinated hydrocarbon moieties or a fluorochloro or fluorobromo moiety. Generally, however, it is preferred that the hydrocarbyl or other aliphatic lipophilic portion of this surfactant should have at least half of the hydrogen which could be present on the carbon atoms thereof replaced by fluorine atoms. Such surfactants can be made by ethoxylation of the corresponding fluorinated alkanol, e.g., perfluoroalkylethanol. Fluorocarbon surfactants useful in the present invention which are fluorinated alkyl-based polyoxyethylene alcohols are available commercially such as from DuPont under the general trade designation "Zonyl FSN" and from the 3M Company under the general trade designation "Fluorad". In particular, Zonyl FSN is believed to be a perfluorinated surfactant represented by Formula I wherein m is from 5 to 9 and n is about 11. Specific nonionic fluorocarbon surfactants which are available from DuPont include FSN, FSN-100, FSO and FSO-100. A specific example of a fluorinated alkyl-based polyoxyethylene alcohol available from the 3M Company is Fluorad FC 170C.

In lieu of the ether-type fluorocarbon surfactants described above, the aqueous coating compositions of the present invention may contain other nonionic analogues such as esters which can be made, for example, by polyethoxylation of the corresponding perfluoroalkylated lower carboxylic acid. Such surfactants are available from the 3M Company under the designations Fluorad FC-430, FC-431 and FC-740. A fluorinated alkyl alkoxylate surfactant also is available from 3M under the designation Fluorad FC-171.

(D) Organic Phosphate Ester

In addition to the above components, the aqueous compositions of the present invention may also contain from about 0.01 to about 5% by weight based on the total weight of the coating composition, of an organic phosphate ester. The inclusion of an organic phosphate ester compound in the coating compositions provides the coating composition with improved corrosion resistance. The organic phosphate ester useful in the coating compositions may comprise the product of the reaction of: a copolymer of allyl alcohol and a styrene; an epoxy aryl ether; and a phosphoric acid. In one embodiment, the organic phosphate ester will comprise the reaction product of about one part of a copolymer of allyl alcohol and a styrene, from about 0.05 to about 5 parts of an epoxy aryl ether and from about 0.1 to about 2 parts of phosphoric acid. The reaction may be conveniently conducted by heating the three components, usually in an organic solvent which may be either a volatile or non-volatile solvent. Examples of volatile solvents included methyl, isobutyl, ketone, isobutyl alcohol, ethyl acetate, etc. An example of a relatively non-volatile solvent is butyl Cellosolve.

The copolymer of allyl alcohol and a styrene preferably is a low molecular weight copolymer prepared from an approximately equimolar mixture of the two monomers. The molecular weight of the copolymer is preferably within the range of from about 500 to about 2500. The styrene monomer may be styrene itself or it may be any of the various substituted styrenes such as monochlorostyrene, alkyl-substituted styrene and alpha-substituted styrene in which the alpha substituent is preferably an alkyl group such as a methyl group. Alkyl-substituted styrenes include 3-methyl styrene, 4-methyl styrene, 3-ethyl styrene, etc. Styrene is the preferred monomer.

The epoxy aryl ethers are compounds which contain both epoxy groups and aryl ether groups, and they are prepared conveniently by the reaction of epichlorohydrin with phenolic compounds. Accordingly, in one embodiment, the epoxy aryl ethers may be epoxy resins of the type identified above as examples of the film-forming thermosetting resins (A) useful in the aqueous coating compositions of the present invention although the epoxy aryl ethers useful in preparing the organic phosphate esters are generally low molecular weight resins such as those having molecular weights of from about 500 to about 2000, although resins having higher molecular weights are also useful.

Generally, for the purposes of this invention, the epoxy aryl ethers are prepared by reacting epichlorohydrin with bisphenol A (di-hydroxyphenyl dimethylomethane), or a phenol formaldehyde resin, or other such aldehydephenol resins. Commercially available epoxy resins prepared from bis-phenol A include the Epon resins marketed by Shell Chemical Company; the Epotuf resins marketed by the Reichhold Chemical Company; and the D.E.R. resins marketed by the Dow Chemical Company. Phenol-formaldehyde-type resins are available from Dow under the designation D.E.N. resins.

Other phenols may be used including polyhydric phenols. Examples of such phenols are resorcinol, hydroquinone, catechol and analogous polyhydric anthracines and naphthalenes. In addition to epichlorohydrin which is preferred, various other halohydrins may be used such as epibromohydrin, and the epihalohydrins of mannitol, sorbitol and aerythritol.

The preferred epoxy aryl ethers used in the reaction to form the organic phosphate esters are those which contain on the average more than one epoxy group and more than one aryl ether group per molecule. A specific example of such a resin is Epotuf 38-501 which is derived from bis-phenol (A) and characterized as having two epoxy groups, two bis-phenol-derived groups per molecule. The product an epoxy equivalent weight of from 450 to 525 and a molecular weight of about 908.

The phosphoric acid reactant is preferably 85% aqueous phosphoric acid. More concentrated phosphoric acid solutions can be used, and in some instances, 100% phosphoric acid or even a more concentrated form of phosphorus pentoxide can be used. In some instances, it may desirable to use less concentrated phosphoric acid solutions such as for example 60% phosphoric acid or even 25% phosphoric acid.

The organic phosphate esters can be prepared by reacting the above components at an elevated temperature generally in the presence of a solvent. Temperatures up to the reflux temperature of the reaction mixture can be utilized and the reaction generally is completed in a period of from 0.5 to about 5 to 10 hours. Any water which is formed during the reaction may be removed from the reaction mixture as an azeotrope.

The following examples illustrate the preparation of these organic phosphate esters. Additional examples and description of such phosphate esters and methods of preparing them are found in U.S. Pat. No. 3,133,838. The disclosure of this patent is incorporated herein by reference. Unless otherwise indicated in the following examples and elsewhere in the specification and claims, all parts and percentages are by weight, temperatures are in degrees Centigrade and pressures are at or near atmospheric pressure.

EXAMPLE D-1

A mixture containing 29 parts of butyl Cellosolve, 11.6 parts of 85% phosphoric acid, 30 parts of Epotuff 38-501 and 29.2 parts of an allyl alcohol:styrene copolymer available from Monsanto under the designation RJ-101 is prepared and heated at the reflux temperature for 5 hours.

EXAMPLE D-2

A solution of 54 parts of a copolymer of equimolar proportions of allyl alcohol and styrene (molecular weight=1100) in 54 parts of methyl isobutyl ketone is added to a solution of 41.4 parts of an epoxy aryl ether (molecular weight=950) prepared by the reaction of bis-phenol (A) and epichlorohydrin, in 14 grams of a 2:1 mixture of methyl isobutyl ketone and xylene. To this resulting solution there are added 336 parts of a 2:1:1 mixture of methyl isobutyl ketone, ethyl acetate and isobutyl alcohol followed by the addition of 100 parts of 85% aqueous phosphoric acid. This mixture is heated at the reflux temperature for about 5 hours and cooled. The contents of the reactor is recovered as reaction product.

The organic phosphate esters which may be utilized in the aqueous coating compositions of the present invention may also comprise the reaction product of a copolymer of allyl alcohol and a styrene, an alkyl phenol, and phosphorus pentoxide. Some of these types of phosphate esters are described in U.S. Pat. No. 3,055,865. The disclosure of this patent is incorporated herein for its description of such esters and the method of preparing them. Generally such phosphate esters can be prepared by mixing one mole of phosphorus pentoxide from about 0.2 to about 12.5 moles of a copolymer of allyl alcohol in a styrene and from about 0.3 to about 5 moles of an alkyl phenol, and heating said mixture at a temperature within the range of from about 75° C. to about 150° C.

The copolymers of allyl alcohol and a styrene useful in this embodiment may be any of the copolymers of allyl alcohol and styrene described above. Generally, the molecular weight of the copolymer used in this embodiment should be within the range of from about 750 to about 1500.

The alkyl phenol reactant may be either a mono-alkyl or a polyalkyl phenol. The alkyl group may range from methyl groups up to alkyl groups derived from olefin polymers having molecular weights as high as 50,000. Preferably, the alkyl phenol is a mono-alkyl phenol in which the alkyl group contains from 1 to about 10 carbon atoms such as cresol, amyl phenol, heptyl phenol, nonyl phenol, etc.

The organic phosphate esters are produced in accordance with this embodiment by mixing the specified reactions, preferably in a solvent, and heating the resulting solution at a temperature within the range of from about 75° C. to 150° C. until the reaction is complete. The following example illustrates the preparation of such an organic phosphate ester.

EXAMPLE D-3

A mixture of 1412 parts (1.2 moles) of a 1:1 molar copolymer of allyl alcohol and styrene having an average molecular weight of about 1100, 168 parts (1 mole) of tert-amyl phenol, 68 parts (0.5 mole) of phosphorus pentoxide and 1648 parts of xylene is prepared at room temperature and then heated at reflux (about 141° C.) for 6 hours. The reaction mixture is stirred throughout this period, and at the end of this period, the xylene is removed by distillation to yield a plastic, non-viscous mass which is diluted with a solvent such as isobutyl alcohol.

(E) Pigment

The aqueous compositions of the present invention may also contain pigments which may be inorganic pigments or dyes. The choice of pigment will depend upon the particular color or colors desired in the coatings. The amount of pigment incorporated into the aqueous compositions of the present invention will be from about 0 to about 25% by weight or more of the total weight of the composition.

Carbon blacks are well-known color pigments often utilized in black formulations. Among the carbon blacks which may be utilized as color pigments in the present invention are furnace blacks, channel blacks and lamp blacks. The pigment powder also may be metal powders, metal oxides and other inorganic compounds. Examples of metallic powders include nickel, nickel flakes, steel flakes, bronze powder, aluminum powder, etc. Among the metallic oxides which can be utilized as pigments are zinc oxide, aluminum oxide, magnesium oxide, silicon, talc, mica, clay, iron oxide red, iron oxide yellow, chrome oxide green and titanium oxide white. Other inorganic pigments which may be utilized to provide desired colors include zinc sulfide, cadmium sulfide, cadmium sulfoselenide, cadmium mercury, calcium carbonate, zinc molybdate, zinc chromate, cobalt aluminate, chrome cobalt-alumina, ultra marine blue and lead carbonate. Organic pigments include Para Red, Lithol Rubine, Halio Bordeaux, Thio Indigo, Toluidine, Anthraquinone, Phthalocyanine Blue, Phthalocyanine Green, Azo, etc.

Typically, the aqueous coating compositions of the present invention will be aqueous dispersions, emulsions or solutions of the water-dispersible or emulsifiable resin, and the concentration of the resin is selected depending upon the conditions to be employed. Generally, concentrations of resin of from about 3 to about 40 or 50% by weight are used. More particularly, improved results are obtained when a concentration of resin to about 10 to about 40% by weight is used, and the voltage and current density are regulated within a safe and economical range. The aqueous coating compositions also will contain from about 0.1 to about 10% by weight, based on the weight of resin (A) of a fluoroalkene polymer (B) and from about 0.01 to about 5% by weight, based on the weight of resin (A) of at least one fluorocarbon surfactant. Water, and minor amounts of other components such as additional surfactants, antioxidants, ultraviolet absorbers, stabilizers, rheology control agents, coalescing agents, leveling agents, etc, comprise the remainder of the coating composition. These supplemental additives may be present such as from about 0 to about 3 to 5% by weight.

One type of supplemental surfactant often used in the coating compositions of this invention are the acetylenic diols such as those available from Air Products under the general designation "Surfynol". Examples include Surfynol 104 which is described as 2,4,7,9-tetramethyl-5-decyn-4,7-diol (or "tetramethyl decynediol"). Solutions of this diol in various solvents are available under designations 104A, 104E, 104H and 104BC. Proprietary blends of acetylenic diols are available from Air Products under designations such as Surfynol GA, SE, TG and PC. Surfynol 61 is dimethyl hexynediol and Surfynol 82 is dimethyl octynediol. Ethoxylated derivatives of tetramethyl decynediol are available as Surfynol 440, 465 and 485.

The coating compositions of the present invention may be prepared in concentrated form containing, for example, from 30 to 70% of solids, and these concentrated dispersions can be diluted with water to form the bath useful for electrocoating the metal substrates. The diluted baths generally will contain from about 5 to 25% by weight of solids, and in one embodiment, about 15% solids.

The concentrate may be reduced to the lower solids content baths by the addition of water. The bath generally is maintained under constant agitation to prevent settling, and the bath is allowed to equilibrate (e.g., at least 24 hours) before coating parts.

The resins which are utilized in the aqueous compositions of the present invention may be solubilized by partially or completely neutralizing the resin with a base such as an amine or potassium hydroxide. Amines and hydroxysubstituted amines such as triethylamine and triethanolamine are examples of amines which have been utilized to neutralize resins for use in aqueous coating compositions which are to be deposited by electrophoretic techniques. With cathodic electrocoating, the resin generally is a basic polymer resin which has been neutralized with a soluble acid. During electrocoating, the amine takes on a hydrogen ion and is driven to the cathode where the hydrogen is liberated. The amine or other neutralizing agent is not completely deposited in the coating and will stay in the bath except for small amounts which are lost through dragout to maintain a relatively constant level of amine, the bath may be treated in an ultra filter or other suitable device to remove amines and other low molecular weight contaminants from the working bath. Coupling agents which assist in solubilizing the resins are frequently added and these include polyol ethers such as, for example, ethylene glycol monobutyl ether and Butyl Carbitol. Water solutions, dispersions and emulsions of thermosetting resins which are useful in the compositions of the present invention are available commercially from a variety of sources, and these may be further diluted or concentrated as desired.

Electrophoresis can be carried out on metal articles maintained on racks of individually hung parts, or the articles may be contained in a porous tray or in a porous barrel. A preferred procedure for electrocoating small metal parts in accordance with this invention comprises placing the parts to be treated on a porous tray or in a porous container which can be vibrated, jolted, jogged or rotated to cause the parts to move during the electrophoretic deposition process. For example, a porous container can be jogged or jolted by means of an eccentric effective to lift and drop the container a given vertical distance at a given frequency. Alternatively, the parts can be placed in a rotatable, porous barrel, and the barrel of parts can be processed through the selective steps of cleaning, phosphating, and an optional chromic rinse. The barrel containing the phosphated parts may then be immersed in the electrocoat resin system either after drying the parts or while still wet.

The barrel of parts is rotated intermittently for five minutes at about 20°-30° C. and at a voltage of from about 25 to about 350 volts. The number of rotation cycles employed may be varied depending upon the type and quantity of parts in the barrel. The amperage drawn is a function of the area of the barrel but it is typically from 1 to about 5 amps per square foot. The parts may then be removed from the barrel (or other porous container), water rinsed, and dried or baked. Alternatively, the resin-coated parts may be rinsed while still in the barrel.

The coatings which are deposited in this manner on metal substrates generally are baked at temperatures sufficient to cause cross-linking of the thermosetting resin(s) and to produce a protective finish. Usually, temperatures of from 90° C. to about 600° C. may be utilized, but more generally temperatures of from 120° C. to 200° C. are satisfactory. Curing times of from 1 to 60 minutes may be used. The coatings deposited in accordance with the present invention exhibit excellent adhesive properties to the metal parts to improve corrosion resistance and an increase in the amount in uniformity in torque properties.

As noted earlier, the aqueous compositions of the present invention may be applied to metal surfaces which have been previously subjected to various chemical or physical cleaning treatments and/or phosphated with an aqueous metal phosphating solution, and/or subsequently rinsed with a chromic acid solution to "seal" the phosphate coating and improve its utility as a base for the application of the coating composition.

Thus, in one embodiment, the coating compositions are applied to metal surfaces having an inorganic phosphate coating thereon. The preparation and use of aqueous phosphating solutions for depositing inorganic phosphate coatings on metal surfaces is well known in the metal finishing art as shown by U.S. Pat. Nos. 1,206,075; 1,485,025; 2,001,754; 2,859,145; 3,090,709; 3,104,177; 3,307,979; 3,364,081 and 3,458,364. The disclosures of these patents regarding inorganic phosphating solutions and the procedures for using such solution are hereby incorporated by reference. The inorganic phosphate coatings may be any of those known in the art including zinc phosphate coatings, iron phosphate coatings, lead phosphate coatings, cadmium phosphate coatings, and mixed calcium-zinc phosphate coatings. The iron phosphate coatings can be applied over iron, steel or alloys thereof, and the zinc phosphate coatings generally are applied over iron steel, zinc, aluminum, or alloys thereof.

In view of the extensive commercial development of the phosphating art and the many journal publications and patents describing the preparation and application of phosphating solutions, it is believed unnecessary to lengthen this specification unduly by a detailed recitation of the many ways in which the application of metal phosphate coatings can be accomplished. It should be sufficient to indicate that any of the commonly used phosphating techniques such as spraying, brushing, dipping, roller-coating, or flow-coating may be employed, and that the temperature of the aqueous phosphating solution may vary within wide limits such as, for example, from room temperature to about 100° C. Generally, best results are obtained when the aqueous phosphating solution is used at a temperature within the range of from about 65° C. to about 100° C. If desired, however, the phosphating baths may be used at higher temperatures when employing super atmospheric pressures.

In the ordinary practice of phosphating a metal surface, the surface generally is cleaned initially by physical and/or chemical means to remove any grease, dirt, or oxides, and then it is phosphated in the manner described above. Cleaning solutions are known in the art and generally are aqueous solutions containing sodium hydroxide, sodium carbonate, an alkali metal silicate, alkali metal metaborate, water softeners, phosphates, and surface active agents. Oxide removal is usually accomplished with mineral acid pickles such as sulfuric acid, hydrochloric acid, and phosphoric acid. This removal could be considered as supplemental cleaning.

The phosphating operation usually is carried out until the desired weight of the phosphate coating is formed on the metallic surface. In the phosphating art, "heavy phosphate" coatings are generally deposited in an amount in excess of 1000 or 1500 mg/ft$^2$ of surface. Lesser amounts of coatings are referred to as "light phosphate" coatings. The time required to form the coating will vary according to the temperature, the type of phosphating solution employed, the particular technique of applying the phosphating solution, and the coating weight desired. In most instances, however, the time required to produce the phosphate coating of the weight preferred for the purpose of the first step of the present invention will be within the range of from about 1 second to as long as 15 to 40 minutes depending on the type of phosphating solution. When high total acid aqueous phosphating solutions are used, the immersion time is from about a few seconds to one to two minutes.

After contact between the surfaces to be treated and the phosphate solution has been effected for the desired period of time, the phosphated article preferably is rinsed, optionally, with water to remove any of the acidic coating solution which may remain on the surface. Preferably, a hot water rinse is used with water temperatures within a range of from about 50° C. to about 100° C. As with the application of the phosphate coating solution, various contacting techniques may be used, with rinsing by dipping or spraying being preferred.

The following examples illustrate the aqueous coating compositions of the present invention (concentrates) and methods of preparing the compositions.

EXAMPLE 1

A first aqueous mixture is prepared which is a grind paste comprising 7.04 parts of Epotuf 38-690 epoxy resin neutralized with 1.2 parts of dimethylethanolamine, 1.01 parts of Surfynol 104 BC which is 50% solution of 2, 4, 7, 9-tetramethyl-5-9-decyn-4, 7-diol in 2-butoxyethanol (available from Air Products), 0.51 part of a foam control agent (Drewplus L-475 from Drew Industrial Division of Ashland Chemical Company), 2.79 parts of carbon black (Raven 1250 from Columbian Carbon) and 11.81 parts of deionized water by mixing at high speed until smooth. A second mixture is prepared comprising 2 parts of polytetrafluoroethylene powder (Shamrock SST-4), 0.4 part of Zonyl FSN and 2 parts of deionized water. The second mixture is added to the grind paste and dispersed in a high-speed grinding operation (pebble mill or sand mill) until a Hegman 6+ grind is achieved, and then, 6 parts of water are added to form a third mixture. A fourth mixture is prepared with a high-speed grinding operation to a Hegman 5+ grind which comprises 14.16 parts of deionized water, 7.62 parts of Vantalc 6H, a magnesium silicate pigment from R. T. Vanderbilt Company, and 0.94 part of dimethylethanolamine. To this fourth mixture is then added a mixture of 20.8 parts of Epotuf 38-690, 6.72 parts of a benzoguanamine available from American Cyanamid as Cymel 1123 and 0.58 parts of triethanolamine. The viscosity is adjusted by adding 4 parts of deionized water. The mixture is filtered through a 150 micron filter, and the filtrate is the desired aqueous composition.

EXAMPLE 2

A first aqueous mixture is prepared which is a grind paste comprising 7.04 parts of Epotuf 38-690 epoxy resin neutralized with 1.2 parts of dimethylethanolamine, 1.01 parts of Surfynol 104 BC which is 50% solution of 2,4,7,9-tetramethyl-5-9-decyn-4,7-diol in 2-butoxyethanol (available from Air Products), 0.51 part of a foam control agent (Drewplus L-475 from Drew Industrial Division of Ashland Chemical Company), 2.79 parts of carbon black (Raven 1250 from Columbian Carbon) and 11.81 parts of deionized water by mixing at high speed until smooth. A second mixture is prepared comprising 2 parts of polytetrafluoroethylene powder (Shamrock SST-4), 0.4 part of Zonyl FSN and 2 parts of deionized water. The second mixture is added to the grind paste and dispersed in a high-speed grinding operation (pebble mill or sand mill) until a Hegman 6+ grind is achieved, and then, 6 parts of water are added to form a third mixture. A fourth mixture is prepared with a high-speed grinding operation to a Hegman 5+ grind which comprises 14.16 parts of deionized water, 7.62 parts of Vantalc 6H, a magnesium silicate pigment from R. T. Vanderbilt Company, and 0.94 part of dimethylethanolamine. To this fourth mixture is then added a mixture of 20.8 parts of Epotuf 38-690, 6.72 parts of a benzoguanamine available from American Cyanamid as Cymel 1123 and 0.58 parts of triethanolamine. A fifth mixture comprising one part of an organic phosphate ester similar to Example D-1, 1 part of butyl Cellosolve and 1 part of deionized water is prepared and is neutralized to a pH of about 7.0 with 0.1 part of triethanol amine. This fifth mixture is then added to a container containing mixtures 3 and 4. The viscosity is adjusted by adding 4 parts of deionized water. The mixture is filtered through a 150 micron filter, and the filtrate is the desired aqueous composition.

EXAMPLE 3

An aqueous mixture is prepared as in Example 2 except that the organic phosphate ester of Example D-1 is replaced by an equivalent amount of the organic phosphate ester of Example D-2.

The coating compositions of the present invention deposit uniform coatings on various metal surfaces, and in particular small metal parts such as nuts and bolts. The coating or finish on the parts is important since it plays important roles in the insulation of fasteners in a joint. For example, the finish affects the amount of friction generated in the threads as the fastener is assembled, especially as the tension increases; the finish protects the bearing surface that mates with the face of the material being joined; and the finish protects the metal fastener from the adverse effects of its surrounding environment, and this protection extends the life of the joint. It has been estimated that for the average joint, 50-55% of the available torque is used overcoming friction at the bearing surface, and 35-40% is used to overcome friction between the threads. The remaining torque is available to create tension in the joint. Torque/tension testing provides a method for evaluating the assembly performance of new finishes. The importance of measuring torque-tension is discussed in the article entitled "Computer-Base Fastener Assembly Performance Analysis at a Large Metal Finishing Company" by Brian P. Lowry, *Fastener Technology International*, pp. 57, 58, 60 and 61, Feb. 1991.

The utility and the advantages of the aqueous coating compositions of the present invention are demonstrated in the following example.

EXAMPLE A

Heavy zinc phosphated M-3 bolts are electrocoated with a coating composition under the following conditions: total time in bath, 5 minutes; voltage, 275 volts; baking, 15 minutes at 350° F. Fifty of the coated bolts are randomly selected, aged three days and placed in a 5% salt fog cabinet at 96° F. (ASTM Test B-117; ASTM Method B-287). The bolts are inspected every 24 hours, and when 50% of the bolts have failed, the test is conducted and the entire group is removed from the test cabinet. For the purposes of this test the appearance of any red rust on the head and/or captive washer constitutes failure of the bolt. Rust on the threads is disregarded.

The bolts coated with the coating composition of Example 2 diluted with water to about 15% solids did not fail until at 192 hours whereas zinc phosphated M-3 bolts coated with a similar coating composition but which did not contain the polytetrafluoroethylene powder or the Zonyl FSN or the organic phosphate of the present invention failed at 72 hours.

EXAMPLE B

Figure 1:
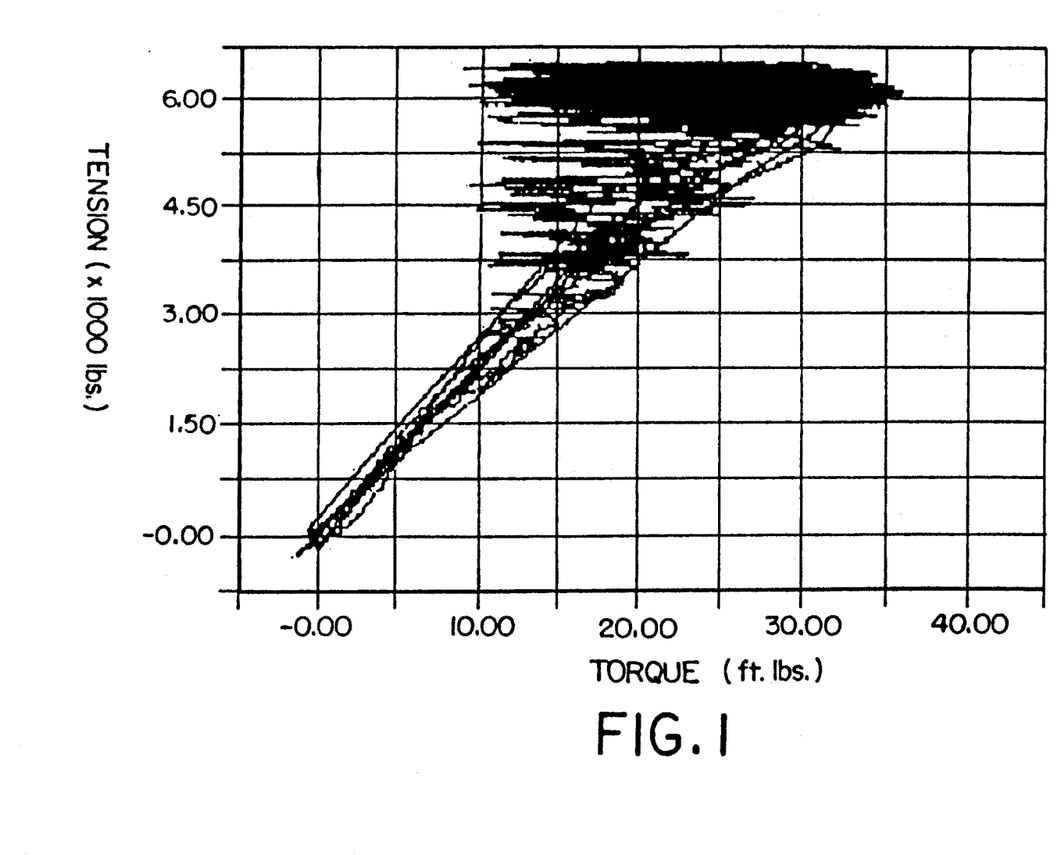
FIG. 1 is a torque-tension graph obtained from a test of bolts coated with coating of the invention.
Figure 2:
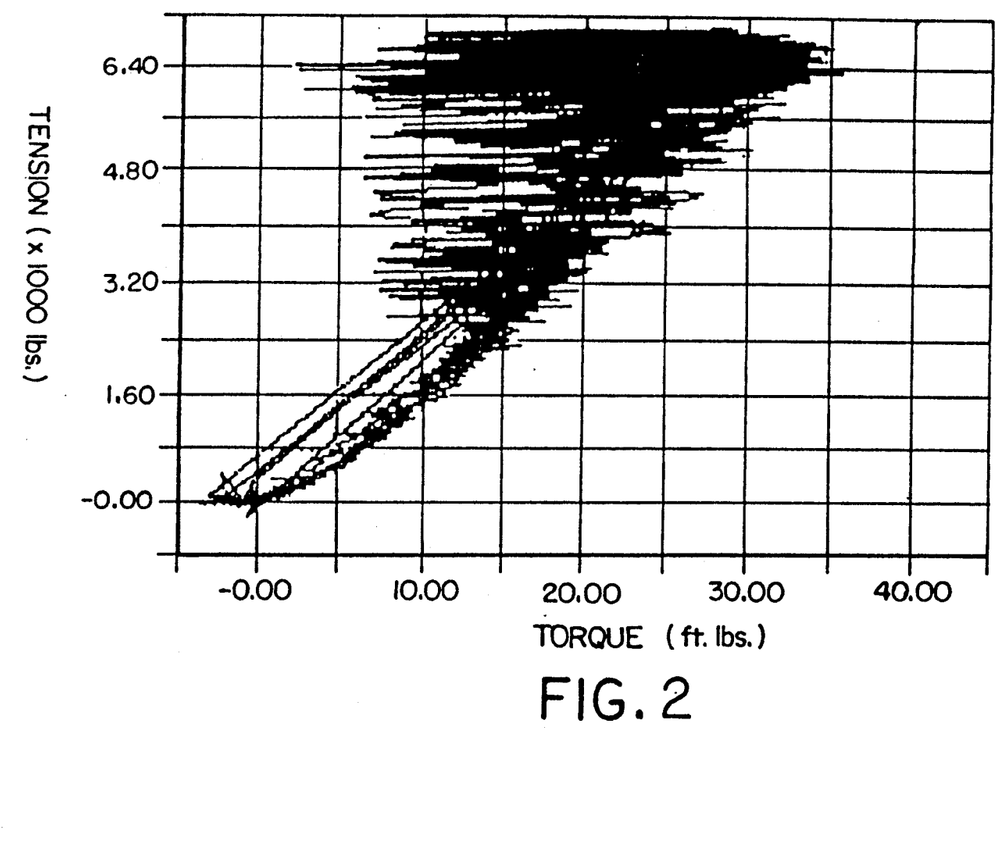
FIG. 2 is a torque tension graph obtained from a test of bolts coated with a coating which is not the invention.

Zinc phosphated 5/16-inch hex bolts (500 grams) are electrocoated under the same conditions as described in Example A. The bolts are subjected to a torque-tension test in computerized equipment available at Curtis Metal Finishing Company, Sterling Heights, MI. The test and the equipment are described by B. P. Lowry, "Computer-Based Fastener Assembly Performance Analysis at a Large Metal Finishing Company", *Fastener Technology International*, February 1991, pp. 57-58, 60-61. In this test, the bolts are driven into a hex nut of appropriate size and the tension which developed as a function of the applied torque (ft.-lbs.) is recorded automatically in a computerized equipment. The results are plotted and recorded on a chart. FIG. 1 is a torque-tension chart obtained with bolts electrocoated with the coating of Example A. FIG. 2 is a torque-tension chart obtained with bolts coated with a similar composition except that the coating formulation did not contain the PTFE powder, Zonyl FSN or the organic phosphate ester. A comparison of the two charts reveals that the bolt coated with a coating of this invention exhibits improved torque slip as evidenced by the narrower band in FIG. 1 as the tension and torque increase. The improvement of the bolts treated in accordance with this invention is also shown by the presence of less "chatter" (fewer and less intense horizontal lines) in FIG. 1 (the invention) compared to FIG. 2.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. An aqueous coating composition comprising
   (A) at least one water-dispersible or emulsifiable film-forming thermosetting resin;
   (B) from about 0.1 to about 8% by weight, based on the weight of (A) of solid polytetrafluoroethylene particles;
   (C) 0.01 to about 5% by weight, based on the weight of (A) of at least one fluorocarbon surfactant characterized by the formula $$F_3C(CF_2)_mCH_2CH_2O(CH_2CH_2O)_nH$$

wherein m is from about 5-9 and n is about 7-13; and
   (D) an organic phosphate ester comprising the product of the reaction of: a copolymer of allyl alcohol and a styrene; an epoxy aryl ether; and phosphoric acid.

2. An aqueous coating composition comprising in addition to water,
   (A) at least one water-dispersible or emulsifiable film-forming resin;
   (B) from about 0.1 to about 15%-by weight, based on the weight of resin (A) of a hydrophobic fluoroalkene polymer;
   (C) an effective amount of at least one nonionic fluorocarbon surfactant; and
   (D) from about 0.01 to about 5% by weight, based on the total weight of the composition, of an organic phosphate ester which comprises the reaction product of phosphorus pentoxide, a copolymer of allyl alcohol and a styrene, and an alkyl phenol.

3. A process for coating substrates with an adherent coating which comprises the steps of
   (A) coating the substrates with an inorganic phosphate coating;
   (B) applying to the phosphate coated substrate, a film of an aqueous composition diluted with water to about 5 to 25% solids, said aqueous composition comprising in addition to water,
      (1) at least one water-dispersible or emulsifiable film-forming resin;
      (2) from about 0.1 to about 15% by weight, based on the weight of resin (1) of a hydrophobic fluoroalkene polymer; and
      (3) an effective amount of at least one nonionic fluorocarbon surfactant; and
   (C) heating the film to form the desired adherent coating on the substrate.

4. A process for coating substrates with an adherent coating which comprises the steps of
   (A) coating the metal substrate with an inorganic phosphate coating;
   (B) applying to the phosphate coated substrate, a film of an aqueous composition containing from about 5 to 25% solid and comprising in addition to water;
      (1) at least one water-dispersible or emulsifiable film-forming thermosetting resin;
      (2) from about 0.1 to about 8% by weight, based on the weight of (1) of solid polytetrafluoroethylene particles;
      (3) 0.01 to about 5% by weight, based on the weight of (1) of at least one fluorocarbon surfactant characterized by the formula $$F_3C(CF_2)_mCH_2CH_2O(CH_2CH_2O)_nH$$

wherein m is from about 5-9 and n is about 7-13; and
      (4) an organic phosphate ester comprising the product of the reaction of: a copolymer of allyl alcohol and a styrene; an epoxy aryl ether; and phosphoric acid; and
   (C) heating the film to form the desired adherent coating on the substrate.

5. An aqueous coating composition comprising in addition to water,
   (A) water-dispersible or emulsifiable film-forming thermosetting resins comprising a mixture of an epoxy resin and an aminoplast resin;
   (B) from about 0.1 to about 8% by weight, based on the weight of (A) of solid polytetrafluoroethylene particles; and
   (C) 0.01 to about 5% by weight, based on the weight of (A) of at least one fluorocarbon surfactant characterized by the formula $$F_3C(CF_2)_mCH_2CH_2O(CH_2CH_2O)_nH$$

wherein m is from about 5-9 and n is about 7-13.

6. The composition of claim 5 also containing from about 0.1 to about 5% by weight, based on the total weight of the composition of
   (D) an organic phosphate ester comprising the product of the reaction of: a copolymer of allyl alcohol and a styrene; an epoxy aryl ether; and phosphoric acid.

7. The composition of claim 5 wherein in (C), m is about 7 and n is about 11.

8. A metal substrate coated in accordance with the process of claim 3.

9. A process for coating substrates with an adherent coating which comprises the steps of
   (A) applying to the substrate, a film of the aqueous composition of claim 1 diluted with water to about 5 to 25% solids; and
   (B) heating the film to form the desired adherent coating on the substrate.

10. A metal substrate coated in accordance with the process of claim 4.

* * * * *